United States Patent [19]

Corliss et al.

[11] 4,280,333
[45] Jul. 28, 1981

[54] PASSIVE ENVIRONMENTAL TEMPERATURE CONTROL SYSTEM

[75] Inventors: John M. Corliss; George H. Stickford, both of Columbus, Ohio

[73] Assignee: The United States of America as represented by the United States Department of Energy, Washington, D.C.

[21] Appl. No.: 21,292

[22] Filed: Mar. 16, 1979

[51] Int. Cl.³ ............... F25D 23/12; F28D 15/00; F24J 3/02
[52] U.S. Cl. .................. 62/259.1; 165/104.21; 126/433; 126/430; 126/436; 165/104.26; 165/104.14
[58] Field of Search ............... 126/433, 436, 446, 400, 126/450, 417, 430; 165/105, 96, 106, 104 S; 237/1 R; 62/259.1

[56] References Cited
U.S. PATENT DOCUMENTS

| | | | |
|---|---|---|---|
| 3,688,838 | 9/1972 | Sturm et al. | 165/105 X |
| 3,983,704 | 10/1976 | McFarland | 126/433 X |
| 3,996,919 | 12/1976 | Hepp | 126/433 |
| 4,008,579 | 12/1977 | Horvay | 165/105 X |
| 4,050,508 | 9/1977 | Buckley | 165/106 X |
| 4,057,963 | 11/1977 | Basiulis | 126/433 |
| 4,058,160 | 11/1977 | Corman et al. | 165/105 |
| 4,064,932 | 12/1977 | Iriarte | 165/105 X |
| 4,080,957 | 3/1978 | Bennett | 126/433 |
| 4,131,158 | 12/1978 | Abhat et al. | 126/435 X |

Primary Examiner—Larry Jones
Attorney, Agent, or Firm—L. E. Carnahan; Roger S. Gaither; James E. Denny

[57] ABSTRACT

Passive environmental heating and cooling systems are described, which utilize heat pipes to transmit heat to or from a thermal reservoir. In a solar heating system, a heat pipe is utilized to carry heat from a solar heat absorber plate that receives sunlight, through a thermal insulation barrier, to a heat storage wall, with the outer end of the pipe which is in contact with the solar absorber being lower than the inner end. The inclining of the heat pipe assures that the portion of working fluid, such as Freon, which is in a liquid phase will fall by gravity to the outer end of the pipe, thereby assuring diode action that prevents the reverse transfer of heat from the reservoir to the outside on cool nights. In a cooling system, the outer end of the pipe which connects to a heat dissipator, is higher than the inner end that is coupled to a cold reservoir, to allow heat transfer only out of the reservoir to the heat dissipator, and not in the reverse direction.

3 Claims, 8 Drawing Figures

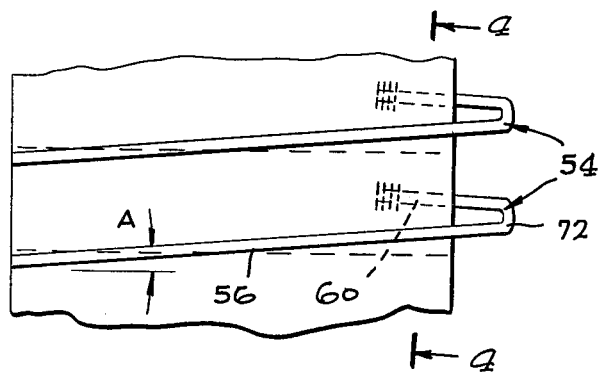
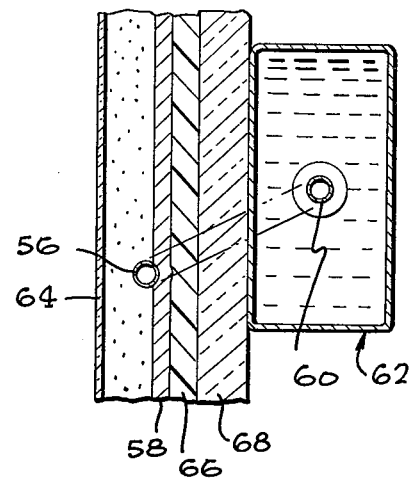
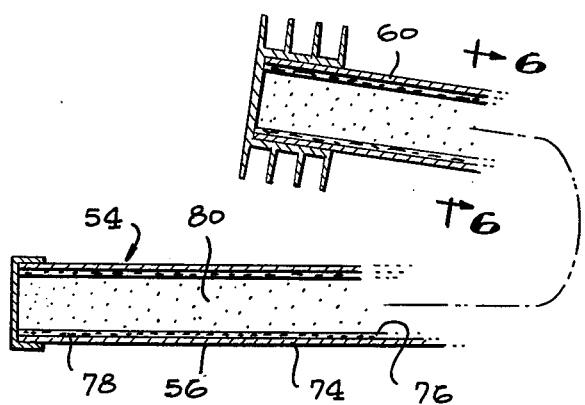
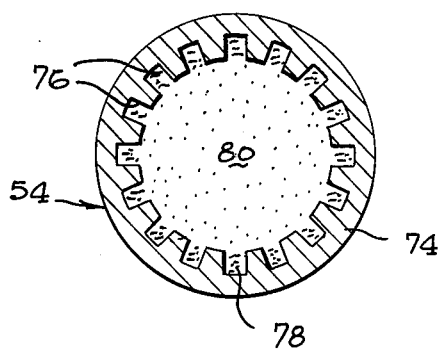
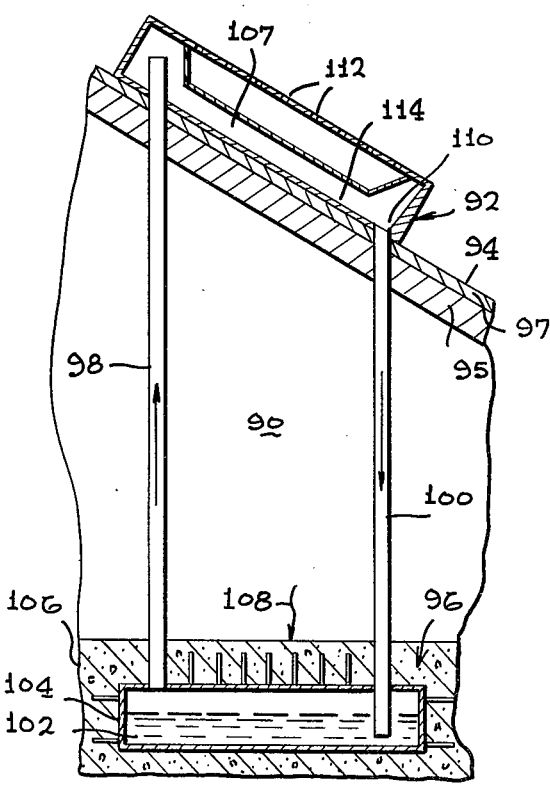

PASSIVE ENVIRONMENTAL TEMPERATURE CONTROL SYSTEM

BACKGROUND OF THE INVENTION

The invention described herein was made at Battelle Columbus Laboratories in the course of, or under, contract EG-77-C-03-1601 between the United States Department of Energy (formerly Energy Research and Development Administration) and the Battelle Memorial Institute of Columbus, Ohio.

One type of solar heating system utilizes a plate which faces the sun to absorb heat therefrom and a thermal reservoir thermally coupled to the plate to absorb heat therefrom and deliver it to an enclosed room. The reservoir can be insulated from the solar plate to avoid the reverse transfer of heat out of the reservoir and into the plate at night when the outdoor temperature is lower than the room temperature. Various active devices have been proposed to efficiently transfer heat between the solar plate and reservoir, such as pumps located along water pipes, but active devices can greatly increase the cost of a system and the need for maintenance. A substantially passive heat transfer device has been proposed, which is sometimes referred to as a heat pipe, and which includes a wick extending along the inside surface of a tube to carry a working liquid to the hot end of a pipe where it evaporates into a vapor, the vapor flowing to the cold end where it condenses into a liquid. However, such devices are capable of carrying heat in either direction, and it is necessary to provide a valve to turn them off at night and on in the morning during the autumn to spring period to avoid cooling the building at night. The daily manual operation of such a valve is inconvenient. Although automatic controls can be utilized to operate such a valve, such controls increase the price of a system and result in more repairs and maintenance. A passive heating system which efficiently utilized sunlight to heat a room, and which avoided the need for active controls or for persons who operate the system daily, would be of considerable benefit in minimizing energy use. If the same approach could be utilized to cool a room in summer, even further energy savings would be possible.

SUMMARY OF THE INVENTION

In accordance with one embodiment of the present invention, a temperature control system is provided for aiding the maintenance of moderate room temperature, which operates passively and yet efficiently transfers heat. In a solar heating system, a heat pipe device is provided which has an outer end connected to an absorber that absorbs solar energy, and which has an inner end connected to a heat reservoir that stores heat and that is isolated by insulating material from the solar absorber. The heat pipe device includes a tube containing an evaporable fluid and forming a conduit for carrying vapor and liquid between the opposite ends of the tube. The conduit forms a liquid passage which permits the free gravity flow of liquid between the pipe ends, and the tube is positioned with the outer end at a lower elevation than the inner end. This arrangement assures that liquid will not accumulate at the inner end of the heat pipe device which is connected to the heat reservoir, to thereby assure that heat will not be carried away from the reservoir back to the environment on cold nights. The difference in elevation which results in a directional or diode heat carrying device, permits the system to operate without daily manipulation of valves by either the occupant of a building or by an automatic control.

In a cooling system designed to cool a building during summer months, a similar heat pipe device is utilized to carry away heat from a reservoir that receives heat from the room, out to a heat dissipating device that dissipates the heat into the environment at night. The heat pipe device is then oriented with its outer end which connects to the dissipator, at a higher elevation than the inner end which connects to the thermal reservoir that is to be maintained at a low temperature. The dissipator can include a roof top radiator which faces in a largely upward direction to radiate heat to the night sky which is normally at a lower temperature than the ambient air.

The novel features of the invention are set forth with particularity in the appended claims. The invention will be best understood from the following description when read in conjunction with the accompanying drawings.

BRIEF DESCRIPTION OF THE DRAWINGS

FIG. 3 is a partial front elevation view of the heating system of FIG. 2.

FIG. 4 is a view taken on the line 4—4 of FIG. 3.

FIG. 5 is a partial sectional view of a portion of the heat pipe device of the system of FIG. 2.

FIG. 6 is a view taken on the line 6—6 of FIG. 5.

FIG. 7 is a simplified sectional view of a passive cooling system constructed in accordance with another embodiment of the invention.

DESCRIPTION OF THE PREFERRED EMBODIMENTS

Figure 1A:
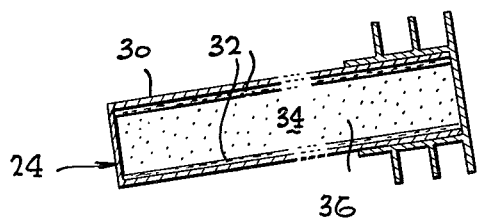
FIG. 1A is a partial sectional view of a heat pipe device of the system of FIG. 1.
Figure 1:
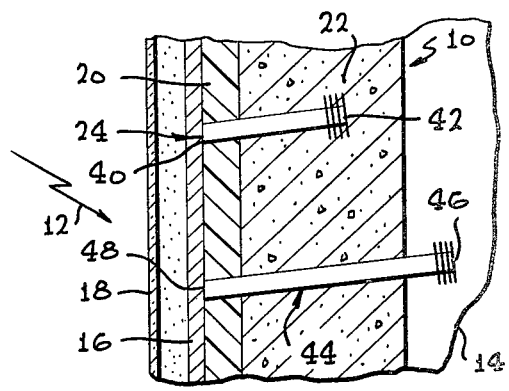
FIG. 1 is a simple sectional view of a solar energy heating system constructed in accordance with one embodiment of the present invention.

FIG. 1 illustrates a passive solar energy heating system 10 for utilizing sunlight indicated by ray 12, to heat an indoor area or room 14 of a building. The system includes a solar heat absorber 16 which receives the sunlight after it passes through a window pane 18 that isolates the absorber from outdoor air which may be cooler than the absorber. Heat from the absorber 16 is transferred, by heat pipe devices, through a thermal insulation barrier 20 to a heat storage reservoir 22 which may be a thick concrete wall or a water tank, that can store heat and transfer it gradually to the room 14. The efficient transference of heat from the absorber 16 to the reservoir 22 is accomplished by the use of heat pipe devices 24 that each can efficiently transfer heat between its opposite ends, and with the outer end of the heat pipe device connected to the absorber 16 to receive heat therefrom and the inner end connected to the reservoir 22 to deliver the heat thereto.

A number of different types of heat pipe devices are known which can transfer considerable heat between its ends when there is only a small temperature difference. Such devices normally utilize a working fluid which can evaporate within the range of temperatures to be encountered, and utilize an evaporator at the hot end of the device to evaporate liquid into vapor to absorb heat, and a condenser at the cold end to condense the vapor into liquid to cause it to give up heat. A problem that can be encountered in the use of such devices, is that on cold nights heat may be carried from the reservoir to the outside by way of the heat pipe. Various valving devices have been devised that can be operated to prevent such a reverse flow of heat, but the operation of such valves requires either an automatic controller or manual operation by an occupant of a building. The use of an automatic controller increases the initial price and upkeep of a system, while daily manual operation is highly inconvenient, and either of these requirements can prevent the wide acceptance of a solar energy heating system.

In accordance with one aspect of the present invention, a heat pipe device 24 is utilized which can operate in a directional or diode manner, to transfer heat in only one direction. The device 24 can have a construction such as that shown in FIG. 1A, wherein the device includes a tube 30 containing an evaporable liquid 32 such as Freon or water that serves as a working fluid that is evaporated and condensed. The tube forms a conduit 34 which can carry a vapor 36 and the liquid 32 between its opposite ends. The conduit 34 is open so that the liquid 32 can flow freely under gravity between the ends thereof. The heat pipe device 24 of FIG. 1 has an outer end 40 connected to the heat absorber 16 to serve as a heat exchanger by evaporating liquid to transfer heat from the absorber to the working fluid. The outer end 40 of the device is at a lower elevation than the inner end 42 which is connected to the thermal reservoir 22. As a result, working fluid which is in a liquid state in the heat pipe device 24 always flows under the force of gravity to the outer end 40 where it can evaporate. If the absorber 16 becomes colder than the thermal reservoir 22, then large reverse heat transfer will not take place along the heat pipe device 34, because there will be no liquid at the inner end 42 of the device that can be evaporated under the higher temperature of the thermal reservoir 22. Thus, there is automatic one-way transfer of heat only in an inward direction to the reservoir 22, and not in an outward direction. Of course, some small amounts of heat can still transfer along the heat pipe by conduction along its tube walls, but the amount of heat that can be transferred in this manner is orders of magnitude lower than the amount of heat that could be transferred by evaporation and cooling of the working liquid at the opposite ends of the device.

In the system 10 of FIG. 1, the thermal reservoir 22 is designed to receive heat during the day when considerable sunlight falls on the absorber 16, and to transfer this heat at night time to the inside of the room 14. Heating of the room during the mid-morning hours can be important since occupants typically require heating soon after they awake and because much of the heat of the reservoir 22 will have been dissipated by then. In order to obtain rapid early morning heating, an additional set of heat pipe devices 44 are provided, which extend through the thermal reservoir 22, so that their inner ends at 46 are more directly coupled to the room 14. The outer ends 48 of the auxiliary heat pipe devices 44 are connected to the absorber 16 to receive heat therefrom, as soon as the absorber becomes warm as a result of early to mid-morning sunlight. The immediate transfer of heat by the device 44 to the room, begins immediate heating of the room, to minimize the delay before the reservoir 22 becomes heated and can then dissipate its heat into the room.

Figure 2:
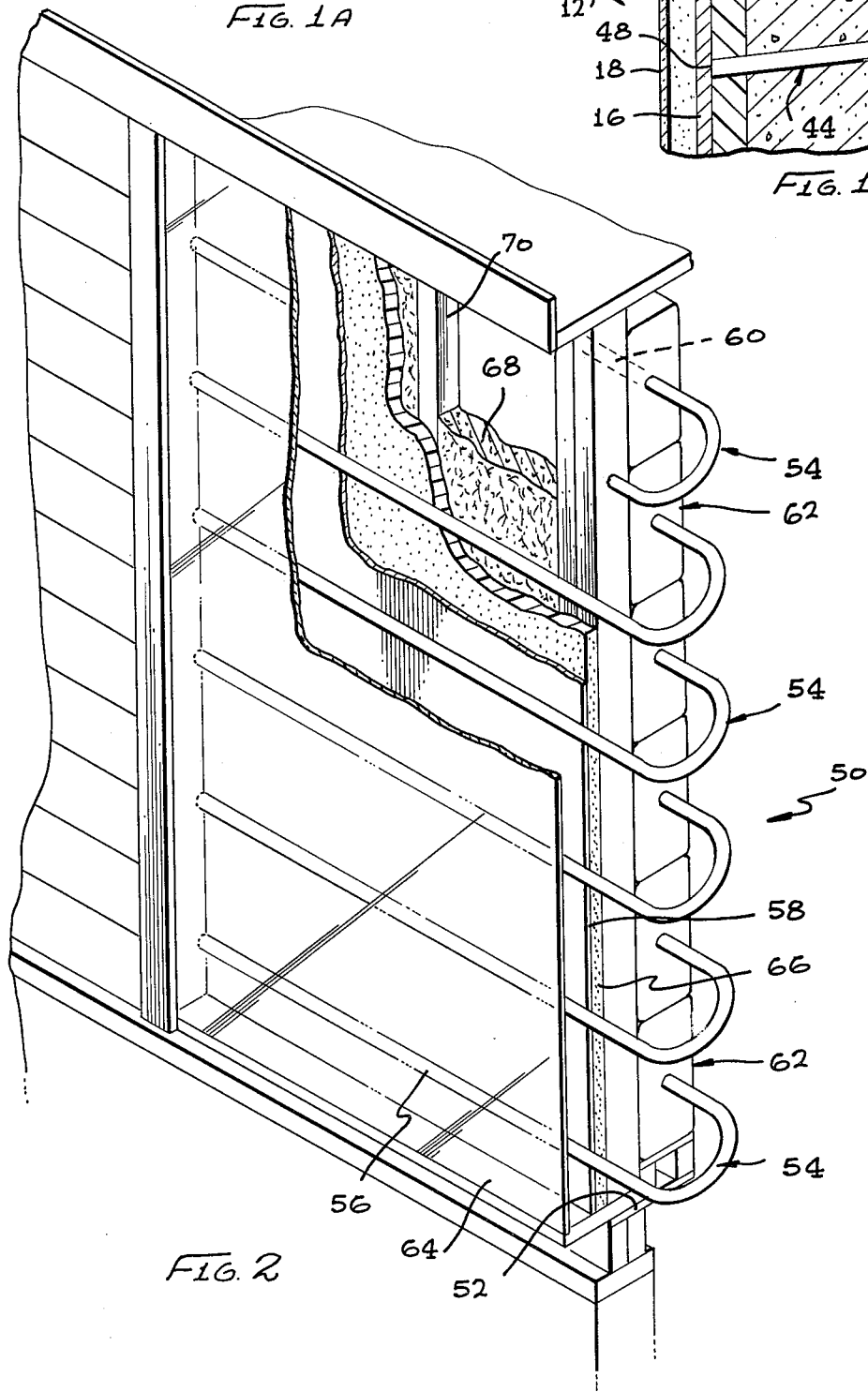
FIG. 2 is a partially sectional perspective view of a solar energy heating system constructed in accordance with another embodiment of the invention.

FIG. 2 illustrates some of the details of another solar energy heating system 50 which is designed as a self contained module that can be installed in an opening 52 of a building. The system includes a group of vertically spaced heat pipe devices 54 having outer ends 56 that extend in a primarily horizontal direction along a plate-like solar heat absorber 58. Each heat pipe also has an inward end portion 60 which lies in a corresponding one of a group of water storage tanks 62 which serve as heat storage reservoirs. A window pane glazing 64 lies in front of the heat absorber 58, while a sheathing layer 66 and an insulation layer 68 which together serve as a thermal insulation barrier, lie between the absorber 58 and the water tank thermal reservoirs 62. The assembly also includes wood studs 70 that provide structural support for the water tanks and the roof of the building.

As also shown in FIGS. 3-6, the inner and outer end portions 56, 60 of the heat pipe device, extend primarily horizontally, but the middle portion 72 extends at a large incline so that the inner heat pipe portion 60 is at a higher level than the outer portion 56. This assures that any liquid in the system will flow under the force of gravity to the outer end portion 56, to allow rapid start up of the system when it first receives sunlight during morning hours. The inner and outer ends 60, 56 are preferably at a slight incline from the horizontal, such as at an angle A of 5° (FIG. 3), to enhance the drainage of liquid working fluid from the inner end portion 60 and help distribute it along the outer end portion 56. The particular heat pipe design has the construction shown in FIGS. 5 and 6, wherein the heat pipe 54 includes a tube 74 having multiple grooves 76 formed along its length. The grooves, which each have a width of about 40 mils (thousandths of an inch) provide passages for the outward flow of the liquid 78 while enhancing the transfer of heat from the material of the pipe 74 to the liquid along the outer end portion 56 of the pipe. The grooves 76 form capillary passages that can hold liquid, but which do not allow liquid to flow up a steep incline. The large space 80 within the pipe provides a conduit for the flow of vapor towards the inner end of the pipe. A variety of working fluids 78 can be utilized, including water for copper pipes, or Freon for aluminum pipes (to avoid corrosion of the aluminum). The pipes are sealed against the loss of vapor. The heat pipe functions to efficiently transfer heat between its outer and inner ends when there is only a small temperature difference between them, and to do so over a wide range of temperatures. Such heat transfer can occur at any temperature above the freezing point of the working fluid 78, since some vapor pressure will form above such a temperature. The almost horizontal, but slightly tilted orientation of the outer tube end portion 56 enhances the delivery of liquid to substantially all portions of the tube outer end.

Although the heating of a building by a passive system is an important way of minimizing fuel costs, passive cooling of a building can further reduce energy consumption, especially in certain regions that become very hot during the summer months. FIG. 7 illustrates a passive cooling system which utilizes a heat pipe arrangement to passively cool a room 90. The cooling apparatus includes a heat exchanger in the form of a condenser and heat dissipator 92 located on the roof 94 of the building, the roof including an insulation barrier 95 and a frame 97. The cooling apparatus also includes an evaporator and cold thermal reservoir 96 located below the roof, and a pair of tubes 98, 100 connecting the dissipator 92 to the reservoir 96. The reservoir 96 can include a water tank or a concrete mass lying under the room or at one side thereof, and is designed to be maintained at a temperature below that of the room 90. The working fluid 102 is held in a container 104 in communication with a heat absorbing wall reservoir 106 which receives heat from the room, as indicated by arrow 108. The dissipator, reservoir, and tubes form a conduit for the circulation of the working fluid.

Heat delivered to the reservoir 106 from the room, evaporates the liquid working fluid at 102, which then rises along the tube 98 to the heat dissipator 92. The lower end of the tube 98 is above the water in the container 104, to receive the vapor. The dissipator 92 functions primarily at night, when its temperature falls to below that of the reservoir at 106. The vapor delivered to the heat dissipator 92 is condensed by it, and becomes a liquid that flows down along the passage 107 formed by the dissipator to the location 110, from which the liquid can flow down along the tube 100 to the container 104. The lower end of the tube 100 is below the surface of water in the container 104, to avoid the upflow of vapor therealong, to thereby promote movement of the working fluid in one direction along the device. The apparatus serves as a heat pipe device, with the heat dissipator 92 forming the outer end of the device and serving as the fluid condenser, the container 104 serving as the inner end of the device and as the evaporator, and the tubes 98, 100 forming part of the conduit for the passage of vapor and liquid. The fact that the heat dissipator and condenser 92 is at a higher elevation than the evaporator and container 104, results in liquid working fluid always dropping down to the container 104. Accordingly, when the heat dissipator 92 is at a high temperature as during a sunny day, there is no liquid in the dissipator 92 that can evaporate and carry heat downwardly to the container 104. Thus, the device has a diode or one way effect, in transferring heat only from the reservoir 96 up to the dissipator 92 for dissipation therefrom, and not in the reverse direction. Of course, valves can be utilized along one or both of the tubes 98, 100 to prevent the loss of heat from the room from autumn to spring. However, such a valve need only be operated at long intervals such as twice a year.

The heat dissipator 92 is designed primarily to radiate heat to the night time sky rather than to dissipate heat by convection currents to the ambient night time air. This is because the radiation temperature of the night time sky is almost always very low, while the ambient temperature at night is not always low. The dissipator 92 includes an anti-convection barrier 112 such as wood slats that permits the radiation of heat from the inner walls 114 of the dissipator to the night time sky, while avoiding some heat transfer between it and ambient outdoor air by convection currents. The fact that the dissipator 92 is located on the roof top where it has an unobstructed "view" of the night time sky, aids in radiating the heat.

Thus, the invention provides a temperature control system for the transfer of heat between the outside and inside of a building to help maintain room temperature, which operates passively so that no external control such as an electronic or mechanical device with moving solid parts is needed to operate the system, and so that daily manual operation is also avoided. A solar energy heating system is provided by utilizing a heat pipe that extends through insulation between a solar energy absorber and a heat reservoir or other means that can transfer heat to the room, with the heat pipe being of a type which provides a free gravity flow path for liquid working fluid therein between its opposite ends, and with the heat pipe positioned so that the outer end which receives heat is at a lower elevation than the inner end which delivers the heat to a reservoir or to the room. This difference in elevation assures that there is substantially no liquid at the inner end of the heat pipe which can evaporate and transfer heat in the reverse direction from the room to the outside at night. The inner end of the heat pipe does not have to be connected to a massive reservoir, but can be coupled directly to the room, with only the metal or the like at the inner end of the heat pipe forming a reservoir that receives heat from condensing liquid and delivers it to the room. Two heat pipes can be utilized in a solar heating system, wherein one has an inner end connected to a massive reservoir to heat it during the day, and the other has an inner end coupled more directly to the room through only a limited reservoir so as to heat the room during early to mid-morning hours. The invention also provides a cooling system which utilizes a heat type device wherein the outer end is at a greater elevation than the inner end, to assure the transfer of heat only in the direction out of the room.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for cooling a room comprising:
 a heat dissiptating device located outside said room, and having a passage with a first end and a lower second end;
 a fluid container insulated from the outdoor environment, lying below said heat dissipating device, thermally coupled to the room, and containing liquid at the bottom portion and vapor at the top portion; and
 first and second pipes connecting said heat dissipating device to said container;
 said frist pipe extending from the top portion of said container to the first end of said passage of said heat dissipating device to carry vapor upwardly thereto, and said second pipe extending the second end of said passage of said heat dissipating device to the container to carry liquid downwardly thereto.

2. A passive temperature control system for aiding in the maintenance of a desired temperature in a room, comprising:
 a heat dissipating device located outside of said room and forming a passage, said device facing the sky to radiate heat thereto, and having an anti-convection barrier separating said passage from ambient air currents;
 a thermal storage reservoir located adjacent to said indoor room to transfer heat between the room and reservoir;
 a thermal insulation barrier located between said heat dissipating device and said room, to avoid the unwanted flow of heat therebetween; and a heat pipe device having an outer end coupled to said passage of said heat dissipating device and an inner end coupled to said reservoir to transfer heat between them, said heat pipe device including a conduit for carrying vapor and liquid phases of an evaporable fluid between its ends, said conduit forming a liquid passage extending between the ends of the heat pipe device which permits the free gravity flow of liquid therebetween, and a first of said heat pipe ends being lower than the other of said ends to thereby permit heat flow along the heat pipe device substantially only in a direction towards the second end of the heat pipe device.

3. A passive cooling system for cooling an indoor room comprising:
- a heat pipe device which includes a heat dissipator mounted at the outside of said room to dissipate heat, and which also includes a first end for receiving vapor and a second end for delivering liquid, with said first end at a greater elevation than said second end;
- a thermal storage reservoir located adjacent to said indoor room to receive heat therefrom; and
- a thermal insulation barrier between said heat dissipator and said room, for preventing the transference of heat from the region of the heat dissipator to the room when the heat dissipator is hot;
- said heat pipe device includes an inner end forming a container which can hold a liquid at the bottom and vapor at the top, and includes an outer end at a higher elevation than the inner end, said heat pipe device contains an evaporable fluid, and said heat pipe device forms a conduit for carrying vapor and liquid between said inner and outer ends and which permits the free gravity flow of liquid therebetween;
- said conduit of said heat pipe device includes a first vapor-carrying tube having a lower tube end connected to the top of said container to receive vapor therefrom and an upper tube end connected to said heat dissipator passage, and includes a second liquid-carrying tube having an upper end connected to said second end of said heat dissipator passage to receive liquid therefrom and a lower end connected to said container.

* * * * *